United States Patent
Shmaiser et al.

(10) Patent No.: US 10,226,920 B2
(45) Date of Patent: Mar. 12, 2019

(54) APPARATUS FOR THREADING AN INTERMEDIATE TRANSFER MEMBER OF A PRINTING SYSTEM (71) Applicant: LANDA CORPORATION LTD., Rehovot (IL)

(72) Inventors: Aharon Shmaiser, Rishon LeZion (IL); Sagi Moskovich, Petach Tikva (IL); Zohar Goldenstein, Nes Ziona (IL); Matan Bar-On, Hod Hasharon (IL); Yiftach Katzir, Kibbutz Bet Guvrin (IL)

(73) Assignee: LANDA CORPORATION LTD., Rehovot ( * ) Notice: Subject to any disclaimer, the term of this patent is extended or adjusted under 35 U.S.C. 154(b) by 0 days.

(21) Appl. No.: 15/564,198

(22) PCT Filed: Apr. 14, 2016

(86) PCT No.: PCT/IB2016/052120
§ 371 (c)(1),
(2) Date: Oct. 4, 2017

(87) PCT Pub. No.: WO2014/166690
PCT Pub. Date: Oct. 20, 2016

(65) Prior Publication Data
US 2018/0126726 A1 May 10, 2018

(30) Foreign Application Priority Data

Apr. 14, 2015 (GB) .................................. 1506314.2

(51) Int. Cl.
*G03G 15/16* (2006.01)
*B41J 2/005* (2006.01)
(Continued)

(52) U.S. Cl.
CPC ........... *B41J 2/0057* (2013.01); *B41J 11/007* (2013.01); *B41J 13/08* (2013.01); *B41J 15/048* (2013.01);
(Continued)

(58) Field of Classification Search
CPC ........ B41J 2/0057; B41J 15/16; B41J 11/007; B41J 13/08; B41J 15/048; B41J 2002/012; B65G 17/323; G03G 15/1615
See application file for complete search history.

(56) References Cited

U.S. PATENT DOCUMENTS 2,839,181 A 6/1958 Renner
3,697,551 A 10/1972 Thomson
(Continued)

FOREIGN PATENT DOCUMENTS

CN 1493514 A 5/2004
CN 1720187 A 1/2006
(Continued)

OTHER PUBLICATIONS

BASF, "JONCRYL 537", Datasheet, Retrieved from the Internet : Mar. 23, 2007 p. 1.
(Continued)

*Primary Examiner* — Ryan D Walsh
(74) *Attorney, Agent, or Firm* — Marc Van Dyke; Fourth Dimension IP (57) ABSTRACT A printing system is described that has an intermediate transfer member in the form of a seamed endless belt for transporting an ink image from an image forming station, at which an ink image is deposited on the intermediate transfer member, to an impression station, where the ink image is transferred onto a printing substrate. The belt has along its edges formations of a greater thickness than the belt. The formations are received in channels to guide the belt and
(Continued)

maintain the belt under lateral tension. Two drive members are provided, each located within a respective one of the channels. The two drive members are connected for movement in synchronism with one another and each has a respective laterally projecting gripper shaped for form locking engagement with the formations on a leading end of a strip from which the intermediate transfer member is to be formed. Rotation of the drive members during installation of a new intermediate transfer member serves to thread the strip through the printing system by pulling the strip from its leading end.

13 Claims, 2 Drawing Sheets (51) Int. Cl.
  B41J 11/00    (2006.01)
  B41J 13/08    (2006.01)
  B41J 15/04    (2006.01)
  B41J 15/16    (2006.01)
  B65G 17/32    (2006.01)
  B41J 2/01     (2006.01)

(52) U.S. Cl.
  CPC ............ *B41J 15/16* (2013.01); *B65G 17/323* (2013.01); *G03G 15/1615* (2013.01); *B41J 2002/012* (2013.01)

(56) References Cited

U.S. PATENT DOCUMENTS

| | | | |
|---|---|---|---|
| 3,898,670 A | 8/1975 | Erikson et al. |
| 3,947,113 A | 3/1976 | Buchan et al. |
| 4,009,958 A | 3/1977 | Kurita et al. |
| 4,093,764 A | 6/1978 | Duckett et al. |
| 4,293,866 A | 10/1981 | Takita et al. |
| 4,401,500 A | 8/1983 | Hamada et al. |
| 4,535,694 A | 8/1985 | Fukuda |
| 4,538,156 A | 8/1985 | Durkee et al. |
| 4,853,737 A | 8/1989 | Hartley et al. |
| 4,976,197 A | 12/1990 | Yamanari et al. |
| 5,012,072 A | 4/1991 | Martin et al. |
| 5,039,339 A | 8/1991 | Phan et al. |
| 5,099,256 A | 3/1992 | Anderson |
| 5,106,417 A | 4/1992 | Hauser et al. |
| 5,128,091 A | 7/1992 | Agur et al. |
| 5,190,582 A | 3/1993 | Shinozuka et al. |
| 5,198,835 A | 3/1993 | Ando et al. |
| 5,246,100 A | 9/1993 | Stone et al. |
| 5,305,099 A | 4/1994 | Morcos |
| 5,352,507 A | 10/1994 | Bresson et al. |
| 5,406,884 A | 4/1995 | Okuda et al. |
| 5,471,233 A | 11/1995 | Okamoto et al. |
| 5,552,875 A | 9/1996 | Sagiv et al. |
| 5,587,779 A | 12/1996 | Heeren et al. |
| 5,608,004 A | 3/1997 | Toyoda et al. |
| 5,613,669 A | 3/1997 | Grueninger |
| 5,614,933 A | 3/1997 | Hindman et al. |
| 5,623,296 A | 4/1997 | Fujino et al. |
| 5,660,108 A | 8/1997 | Pensavecchia |
| 5,677,719 A | 10/1997 | Granzow |
| 5,679,463 A | 10/1997 | Visser et al. |
| 5,698,018 A | 12/1997 | Bishop et al. |
| 5,723,242 A | 3/1998 | Woo et al. |
| 5,733,698 A | 3/1998 | Lehman et al. |
| 5,736,250 A | 4/1998 | Heeks et al. |
| 5,772,746 A | 6/1998 | Sawada et al. |
| 5,777,576 A | 7/1998 | Zur et al. |
| 5,777,650 A | 7/1998 | Blank |
| 5,841,456 A | 11/1998 | Takei et al. |
| 5,859,076 A | 1/1999 | Kozma et al. |
| 5,880,214 A | 3/1999 | Okuda |
| 5,883,144 A | 3/1999 | Bambara et al. |
| 5,883,145 A | 3/1999 | Hurley et al. |
| 5,884,559 A | 3/1999 | Okubo et al. |
| 5,891,934 A | 4/1999 | Moffatt et al. |
| 5,895,711 A | 4/1999 | Yamaki et al. |
| 5,902,841 A | 5/1999 | Jaeger et al. |
| 5,923,929 A | 7/1999 | Ben et al. |
| 5,929,129 A | 7/1999 | Feichtinger |
| 5,932,659 A | 8/1999 | Bambara et al. |
| 5,935,751 A | 8/1999 | Matsuoka et al. |
| 5,978,631 A | 11/1999 | Lee |
| 5,978,638 A | 11/1999 | Tanaka et al. |
| 6,004,647 A | 12/1999 | Bambara et al. |
| 6,009,284 A | 12/1999 | Weinberger et al. |
| 6,024,018 A | 2/2000 | Darel et al. |
| 6,024,786 A | 2/2000 | Gore |
| 6,033,049 A | 3/2000 | Fukuda |
| 6,053,438 A | 4/2000 | Romano, Jr. et al. |
| 6,055,396 A | 4/2000 | Pang |
| 6,059,407 A | 5/2000 | Komatsu et al. |
| 6,071,368 A | 6/2000 | Boyd et al. |
| 6,102,538 A | 8/2000 | Ochi et al. |
| 6,103,775 A | 8/2000 | Bambara et al. |
| 6,108,513 A | 8/2000 | Landa et al. |
| 6,132,541 A * | 10/2000 | Heaton ................ B29C 65/02 156/159 |
| 6,143,807 A | 11/2000 | Lin et al. |
| 6,166,105 A | 12/2000 | Santilli et al. |
| 6,195,112 B1 | 2/2001 | Fassler et al. |
| 6,196,674 B1 | 3/2001 | Takemoto |
| 6,213,580 B1 | 4/2001 | Segerstrom et al. |
| 6,214,894 B1 | 4/2001 | Bambara et al. |
| 6,221,928 B1 | 4/2001 | Kozma et al. |
| 6,234,625 B1 | 5/2001 | Wen |
| 6,242,503 B1 | 6/2001 | Kozma et al. |
| 6,257,716 B1 | 7/2001 | Yanagawa et al. |
| 6,262,137 B1 | 7/2001 | Kozma et al. |
| 6,262,207 B1 | 7/2001 | Rao et al. |
| 6,303,215 B1 | 10/2001 | Sonobe et al. |
| 6,316,512 B1 | 11/2001 | Bambara et al. |
| 6,332,943 B1 | 12/2001 | Herrmann et al. |
| 6,354,700 B1 | 3/2002 | Roth |
| 6,357,870 B1 | 3/2002 | Beach et al. |
| 6,358,660 B1 | 3/2002 | Agler et al. |
| 6,363,234 B2 | 3/2002 | Landa et al. |
| 6,364,451 B1 | 4/2002 | Silverbrook |
| 6,383,278 B1 | 5/2002 | Hirasa et al. |
| 6,386,697 B1 | 5/2002 | Yamamoto et al. |
| 6,390,617 B1 | 5/2002 | Iwao |
| 6,397,034 B1 | 5/2002 | Tarnawskyj et al. |
| 6,402,317 B2 | 6/2002 | Yanagawa et al. |
| 6,409,331 B1 | 6/2002 | Gelbart |
| 6,432,501 B1 | 8/2002 | Yang et al. |
| 6,438,352 B1 | 8/2002 | Landa et al. |
| 6,454,378 B1 | 9/2002 | Silverbrook et al. |
| 6,471,803 B1 * | 10/2002 | Pelland ................ B29C 65/103 156/272.8 |
| 6,530,321 B2 | 3/2003 | Andrew et al. |
| 6,530,657 B2 | 3/2003 | Polierer |
| 6,531,520 B1 | 3/2003 | Bambara et al. |
| 6,551,394 B2 | 4/2003 | Hirasa et al. |
| 6,551,716 B1 | 4/2003 | Landa et al. |
| 6,559,969 B1 | 5/2003 | Lapstun |
| 6,575,547 B2 | 6/2003 | Sakuma |
| 6,586,100 B1 | 7/2003 | Pickering et al. |
| 6,590,012 B2 | 7/2003 | Miyabayashi |
| 6,608,979 B1 | 8/2003 | Landa et al. |
| 6,623,817 B1 | 9/2003 | Yang et al. |
| 6,630,047 B2 | 10/2003 | Jing et al. |
| 6,639,527 B2 | 10/2003 | Johnson |
| 6,648,468 B2 | 11/2003 | Shinkoda et al. |
| 6,678,068 B1 | 1/2004 | Richter et al. |
| 6,682,189 B2 | 1/2004 | May et al. |
| 6,685,769 B1 | 2/2004 | Karl et al. |
| 6,704,535 B2 | 3/2004 | Kobayashi et al. |
| 6,709,096 B1 | 3/2004 | Beach et al. |
| 6,716,562 B2 | 4/2004 | Uehara et al. |
| 6,719,423 B2 | 4/2004 | Chowdry et al. |
| 6,720,367 B2 | 4/2004 | Taniguchi et al. |

(56) References Cited

U.S. PATENT DOCUMENTS

| | | |
|---|---|---|
| 6,755,519 B2 | 6/2004 | Gelbart et al. |
| 6,761,446 B2 | 7/2004 | Chowdry et al. |
| 6,770,331 B1 | 8/2004 | Mielke et al. |
| 6,789,887 B2 | 9/2004 | Yang et al. |
| 6,827,018 B1 | 12/2004 | Hartmann et al. |
| 6,898,403 B2 | 5/2005 | Baker et al. |
| 6,912,952 B1 | 7/2005 | Landa et al. |
| 6,916,862 B2 | 7/2005 | Ota et al. |
| 6,917,437 B1 | 7/2005 | Myers et al. |
| 6,970,674 B2 | 11/2005 | Sato et al. |
| 6,974,022 B2 | 12/2005 | Saeki |
| 6,982,799 B2 | 1/2006 | Lapstun |
| 7,057,760 B2 | 6/2006 | Lapstun et al. |
| 7,084,202 B2 | 8/2006 | Pickering et al. |
| 7,128,412 B2 | 10/2006 | King et al. |
| 7,160,377 B2 | 1/2007 | Zoch et al. |
| 7,204,584 B2 | 4/2007 | Lean et al. |
| 7,224,478 B1 | 5/2007 | Lapstun et al. |
| 7,271,213 B2 | 9/2007 | Hoshida et al. |
| 7,296,882 B2 | 11/2007 | Buehler et al. |
| 7,300,133 B1 | 11/2007 | Folkins et al. |
| 7,300,147 B2 | 11/2007 | Johnson |
| 7,304,753 B1 | 12/2007 | Richter et al. |
| 7,322,689 B2 | 1/2008 | Kohne et al. |
| 7,348,368 B2 | 3/2008 | Kakiuchi et al. |
| 7,360,887 B2 | 4/2008 | Konno |
| 7,362,464 B2 | 4/2008 | Kitazawa |
| 7,459,491 B2 | 12/2008 | Tyvoll et al. |
| 7,527,359 B2 | 5/2009 | Stevenson et al. |
| 7,612,125 B2 | 11/2009 | Muller et al. |
| 7,655,707 B2 | 2/2010 | Ma |
| 7,655,708 B2 | 2/2010 | House et al. |
| 7,699,922 B2 | 4/2010 | Breton et al. |
| 7,708,371 B2 | 5/2010 | Yamanobe |
| 7,709,074 B2 | 5/2010 | Uchida et al. |
| 7,712,890 B2 | 5/2010 | Yahiro |
| 7,732,543 B2 | 6/2010 | Loch et al. |
| 7,732,583 B2 | 6/2010 | Annoura et al. |
| 7,808,670 B2 | 10/2010 | Lapstun et al. |
| 7,810,922 B2 | 10/2010 | Gervasi et al. |
| 7,845,788 B2 | 12/2010 | Oku |
| 7,867,327 B2 | 1/2011 | Sano et al. |
| 7,876,345 B2 | 1/2011 | Houjou |
| 7,910,183 B2 | 3/2011 | Wu |
| 7,919,544 B2 | 4/2011 | Matsuyama et al. |
| 7,942,516 B2 | 5/2011 | Ohara et al. |
| 7,977,408 B2 | 7/2011 | Matsuyama et al. |
| 7,985,784 B2 | 7/2011 | Kanaya et al. |
| 8,002,400 B2 | 8/2011 | Kibayashi et al. |
| 8,012,538 B2 | 9/2011 | Yokouchi |
| 8,025,389 B2 | 9/2011 | Yamanobe et al. |
| 8,042,906 B2 | 10/2011 | Chiwata et al. |
| 8,059,309 B2 | 11/2011 | Lapstun et al. |
| 8,095,054 B2 * | 1/2012 | Nakamura ......... G03G 15/1605 399/162 |
| 8,109,595 B2 | 2/2012 | Tanaka et al. |
| 8,147,055 B2 | 4/2012 | Cellura et al. |
| 8,177,351 B2 | 5/2012 | Taniuchi et al. |
| 8,186,820 B2 | 5/2012 | Chiwata |
| 8,192,904 B2 | 6/2012 | Nagai et al. |
| 8,215,762 B2 | 7/2012 | Ageishi |
| 8,242,201 B2 | 8/2012 | Goto et al. |
| 8,256,857 B2 | 9/2012 | Folkins et al. |
| 8,263,683 B2 | 9/2012 | Gibson et al. |
| 8,264,135 B2 | 9/2012 | Ozolins et al. |
| 8,295,733 B2 | 10/2012 | Imoto |
| 8,303,072 B2 | 11/2012 | Shibata et al. |
| 8,304,043 B2 | 11/2012 | Nagashima et al. |
| 8,460,450 B2 | 6/2013 | Taverizatshy et al. |
| 8,474,963 B2 | 7/2013 | Hasegawa et al. |
| 8,536,268 B2 | 9/2013 | Karjala et al. |
| 8,546,466 B2 | 10/2013 | Yamashita et al. |
| 8,556,400 B2 | 10/2013 | Yatake et al. |
| 8,693,032 B2 | 4/2014 | Goddard et al. |
| 8,711,304 B2 | 4/2014 | Mathew et al. |
| 8,714,731 B2 | 5/2014 | Leung et al. |
| 8,746,873 B2 | 6/2014 | Tsukamoto et al. |
| 8,779,027 B2 | 7/2014 | Idemura et al. |
| 8,802,221 B2 | 8/2014 | Noguchi et al. |
| 8,894,198 B2 | 11/2014 | Hook et al. |
| 8,919,946 B2 | 12/2014 | Suzuki et al. |
| 9,327,496 B2 | 5/2016 | Landa et al. |
| 9,353,273 B2 | 5/2016 | Landa et al. |
| 9,505,208 B2 | 11/2016 | Shmaiser et al. |
| 9,643,400 B2 | 5/2017 | Landa et al. |
| 9,776,391 B2 | 10/2017 | Landa et al. |
| 9,914,316 B2 * | 3/2018 | Landa .................. B41M 5/0256 |
| 2001/0022607 A1 | 9/2001 | Takahashi et al. |
| 2002/0064404 A1 | 5/2002 | Iwai |
| 2002/0102374 A1 | 8/2002 | Gervasi et al. |
| 2002/0150408 A1 * | 10/2002 | Mosher .................. B29C 65/56 399/222 |
| 2002/0164494 A1 | 11/2002 | Grant et al. |
| 2002/0197481 A1 | 12/2002 | Jing et al. |
| 2003/0004025 A1 | 1/2003 | Okuno et al. |
| 2003/0018119 A1 | 1/2003 | Frenkel et al. |
| 2003/0032700 A1 | 2/2003 | Morrison et al. |
| 2003/0055129 A1 | 3/2003 | Alford |
| 2003/0118381 A1 | 6/2003 | Law |
| 2003/0129435 A1 | 7/2003 | Blankenship et al. |
| 2003/0186147 A1 | 10/2003 | Pickering et al. |
| 2003/0214568 A1 | 11/2003 | Nishikawa et al. |
| 2003/0234849 A1 | 12/2003 | Pan et al. |
| 2004/0003863 A1 | 1/2004 | Eckhardt |
| 2004/0020382 A1 | 2/2004 | McLean et al. |
| 2004/0087707 A1 | 5/2004 | Zoch et al. |
| 2004/0228642 A1 | 11/2004 | Iida et al. |
| 2004/0246324 A1 | 12/2004 | Nakashima et al. |
| 2004/0246326 A1 | 12/2004 | Dwyer et al. |
| 2005/0082146 A1 | 4/2005 | Axmann |
| 2005/0110855 A1 | 5/2005 | Taniuchi et al. |
| 2005/0134874 A1 | 6/2005 | Overall et al. |
| 2005/0150408 A1 | 7/2005 | Hesterman |
| 2005/0235870 A1 | 10/2005 | Ishihara |
| 2005/0266332 A1 | 12/2005 | Pavlisko et al. |
| 2006/0135709 A1 | 6/2006 | Hasegawa et al. |
| 2006/0164488 A1 | 7/2006 | Taniuchi et al. |
| 2006/0164489 A1 | 7/2006 | Vega et al. |
| 2006/0233578 A1 | 10/2006 | Maki et al. |
| 2007/0014595 A1 | 1/2007 | Kawagoe |
| 2007/0029171 A1 | 2/2007 | Nemedi |
| 2007/0134030 A1 | 6/2007 | Lior et al. |
| 2007/0146462 A1 | 6/2007 | Taniuchi et al. |
| 2007/0176995 A1 | 8/2007 | Kadomatsu et al. |
| 2007/0189819 A1 | 8/2007 | Uehara et al. |
| 2007/0229639 A1 | 10/2007 | Yahiro |
| 2007/0285486 A1 | 12/2007 | Harris et al. |
| 2008/0006176 A1 | 1/2008 | Houjou |
| 2008/0030536 A1 | 2/2008 | Furukawa et al. |
| 2008/0032072 A1 | 2/2008 | Taniuchi et al. |
| 2008/0044587 A1 | 2/2008 | Maeno et al. |
| 2008/0055381 A1 | 3/2008 | Doi et al. |
| 2008/0074462 A1 | 3/2008 | Hirakawa |
| 2008/0138546 A1 | 6/2008 | Soria et al. |
| 2008/0166495 A1 | 7/2008 | Maeno et al. |
| 2008/0167185 A1 | 7/2008 | Hirota |
| 2008/0196612 A1 | 8/2008 | Rancourt et al. |
| 2008/0196621 A1 | 8/2008 | Ikuno et al. |
| 2009/0022504 A1 | 1/2009 | Kuwabara et al. |
| 2009/0041932 A1 | 2/2009 | Ishizuka et al. |
| 2009/0074492 A1 | 3/2009 | Ito |
| 2009/0082503 A1 | 3/2009 | Yanagi et al. |
| 2009/0087565 A1 | 4/2009 | Houjou |
| 2009/0098385 A1 * | 4/2009 | Kaemper ................ B29C 66/14 428/422.8 |
| 2009/0116885 A1 | 5/2009 | Ando |
| 2009/0165937 A1 | 7/2009 | Inoue et al. |
| 2009/0190951 A1 | 7/2009 | Torimaru et al. |
| 2009/0202275 A1 | 8/2009 | Nishida et al. |
| 2009/0211490 A1 | 8/2009 | Ikuno et al. |
| 2009/0237479 A1 | 9/2009 | Yamashita et al. |
| 2009/0256896 A1 | 10/2009 | Scarlata |
| 2009/0315926 A1 | 12/2009 | Yamanobe |
| 2009/0317555 A1 | 12/2009 | Hori |

(56) References Cited

U.S. PATENT DOCUMENTS

| | | |
|---|---|---|
| 2009/0318591 A1 | 12/2009 | Ageishi et al. |
| 2010/0012023 A1 | 1/2010 | Lefevre et al. |
| 2010/0066796 A1 | 3/2010 | Yanagi et al. |
| 2010/0075843 A1 | 3/2010 | Ikuno et al. |
| 2010/0086692 A1 | 4/2010 | Ohta et al. |
| 2010/0091064 A1 | 4/2010 | Araki et al. |
| 2010/0282100 A1 | 11/2010 | Okuda et al. |
| 2010/0285221 A1 | 11/2010 | Oki et al. |
| 2010/0303504 A1 | 12/2010 | Funamoto et al. |
| 2010/0310281 A1 | 12/2010 | Miura et al. |
| 2011/0044724 A1 | 2/2011 | Funamoto et al. |
| 2011/0058001 A1 | 3/2011 | Gila et al. |
| 2011/0085828 A1 | 4/2011 | Kosako et al. |
| 2011/0141188 A1 | 6/2011 | Morita |
| 2011/0150541 A1 | 6/2011 | Michibata |
| 2011/0169889 A1 | 7/2011 | Kojima et al. |
| 2011/0195260 A1 | 8/2011 | Lee et al. |
| 2011/0199414 A1 | 8/2011 | Lang |
| 2011/0234683 A1 | 9/2011 | Komatsu |
| 2011/0234689 A1 | 9/2011 | Saito |
| 2011/0269885 A1 | 11/2011 | Imai |
| 2011/0279554 A1 | 11/2011 | Dannhauser et al. |
| 2011/0304674 A1 | 12/2011 | Sambhy et al. |
| 2012/0013694 A1 | 1/2012 | Kanke |
| 2012/0013928 A1 | 1/2012 | Yoshida et al. |
| 2012/0026224 A1 | 2/2012 | Anthony et al. |
| 2012/0039647 A1 | 2/2012 | Brewington et al. |
| 2012/0098882 A1 | 4/2012 | Onishi et al. |
| 2012/0105561 A1 | 5/2012 | Taniuchi et al. |
| 2012/0113180 A1 | 5/2012 | Tanaka et al. |
| 2012/0113203 A1 | 5/2012 | Kushida et al. |
| 2012/0127250 A1 | 5/2012 | Kanasugi et al. |
| 2012/0127251 A1 | 5/2012 | Tsuji et al. |
| 2012/0140009 A1 | 6/2012 | Kanasugi et al. |
| 2012/0156375 A1 | 6/2012 | Brust et al. |
| 2012/0162302 A1 | 6/2012 | Oguchi et al. |
| 2012/0194830 A1 | 8/2012 | Gaertner et al. |
| 2012/0237260 A1 | 9/2012 | Sengoku et al. |
| 2012/0287260 A1 | 11/2012 | Lu et al. |
| 2013/0088543 A1 | 4/2013 | Tsuji et al. |
| 2013/0338273 A1 | 12/2013 | Shimanaka et al. |
| 2014/0043398 A1 | 2/2014 | Butler et al. |
| 2014/0104360 A1 | 4/2014 | Häcker et al. |
| 2014/0339056 A1 | 11/2014 | Iwakoshi et al. |
| 2015/0015650 A1* | 1/2015 | Landa ............... B41J 2/0057 347/103 |
| 2015/0022602 A1* | 1/2015 | Landa ............... G03G 15/0189 347/102 |
| 2015/0024648 A1 | 1/2015 | Landa et al. |
| 2015/0025179 A1 | 1/2015 | Landa et al. |
| 2015/0042736 A1* | 2/2015 | Landa ............... B41J 2/0057 347/103 |
| 2015/0049134 A1* | 2/2015 | Shmaiser ........... G03G 15/238 347/1 |
| 2015/0054865 A1 | 2/2015 | Landa et al. |
| 2015/0072090 A1 | 3/2015 | Landa et al. |
| 2015/0118503 A1 | 4/2015 | Landa et al. |
| 2015/0165759 A1* | 6/2015 | Landa ............... B41J 2/0057 347/103 |
| 2015/0336378 A1* | 11/2015 | Guttmann ........... B65H 3/0816 101/483 |
| 2016/0075130 A1* | 3/2016 | Landa ............... B41J 2/0057 347/103 |
| 2016/0167363 A1* | 6/2016 | Landa ............... B41J 2/01 347/103 |
| 2016/0207306 A1* | 7/2016 | Landa ............... B41M 5/0256 |
| 2017/0080705 A1* | 3/2017 | Shmaiser ........... B41J 2/0057 |
| 2017/0113455 A1* | 4/2017 | Landa ............... B41J 2/0057 |
| 2017/0192374 A1 | 7/2017 | Landa et al. |
| 2017/0361602 A1 | 12/2017 | Landa et al. |
| 2018/0065358 A1* | 3/2018 | Landa ............... B41J 2/0057 |
| 2018/0079201 A1* | 3/2018 | Landa ............... B41J 2/0057 |
| 2018/0117906 A1* | 5/2018 | Landa ............... B41J 2/0057 |
| 2018/0134031 A1* | 5/2018 | Shmaiser ........... B41J 3/60 |
| 2018/0222235 A1 | 8/2018 | Landa et al. |
| 2018/0259888 A1 | 9/2018 | Mitsui et al. |

FOREIGN PATENT DOCUMENTS

| | | |
|---|---|---|
| CN | 1261831 C | 6/2006 |
| CN | 1289368 C | 12/2006 |
| CN | 101177057 A | 5/2008 |
| CN | 101835611 A | 9/2010 |
| CN | 101873982 A | 10/2010 |
| CN | 102555450 A | 7/2012 |
| CN | 102925002 A | 2/2013 |
| CN | 103991293 A | 8/2014 |
| DE | 102010060999 A1 | 6/2012 |
| EP | 0457551 A2 | 11/1991 |
| EP | 0613791 A2 | 9/1994 |
| EP | 0784244 A2 | 7/1997 |
| EP | 0843236 A2 | 5/1998 |
| EP | 1013466 A2 | 6/2000 |
| EP | 1158029 A1 | 11/2001 |
| EP | 2028238 A1 | 2/2009 |
| EP | 2270070 A1 | 1/2011 |
| GB | 1520932 | 8/1978 |
| JP | S567968 A | 1/1981 |
| JP | H05147208 A | 6/1993 |
| JP | H07112841 A | 5/1995 |
| JP | H11503244 A | 3/1999 |
| JP | 2000169772 A | 6/2000 |
| JP | 2001206522 A | 7/2001 |
| JP | 2002169383 A | 6/2002 |
| JP | 2002229276 A | 8/2002 |
| JP | 2002234243 A | 8/2002 |
| JP | 2002278365 A | 9/2002 |
| JP | 2002326733 A | 11/2002 |
| JP | 2002371208 A | 12/2002 |
| JP | 2003057967 A | 2/2003 |
| JP | 2003114558 A | 4/2003 |
| JP | 2003211770 A | 7/2003 |
| JP | 2003246484 A | 9/2003 |
| JP | 2004114377 A | 4/2004 |
| JP | 2004114675 A | 4/2004 |
| JP | 2004231711 A | 8/2004 |
| JP | 2005014255 A | 1/2005 |
| JP | 2005014256 A | 1/2005 |
| JP | 2006102975 A | 4/2006 |
| JP | 2006137127 A | 6/2006 |
| JP | 2006347081 A | 12/2006 |
| JP | 2007069584 A | 3/2007 |
| JP | 2007190745 A | 8/2007 |
| JP | 2007216673 A | 8/2007 |
| JP | 2007253347 A | 10/2007 |
| JP | 2007334125 A | 12/2007 |
| JP | 2008006816 A | 1/2008 |
| JP | 2008018716 A | 1/2008 |
| JP | 2008019286 A | 1/2008 |
| JP | 2008142962 A | 6/2008 |
| JP | 2008532794 A | 8/2008 |
| JP | 2008201564 A | 9/2008 |
| JP | 2008255135 A | 10/2008 |
| JP | 2009045794 A | 3/2009 |
| JP | 2009045885 A | 3/2009 |
| JP | 2009083317 A | 4/2009 |
| JP | 2009083325 A | 4/2009 |
| JP | 2009096175 A | 5/2009 |
| JP | 2009154330 A | 7/2009 |
| JP | 2009190375 A | 8/2009 |
| JP | 2009202355 A | 9/2009 |
| JP | 2009214318 A | 9/2009 |
| JP | 2009214439 A | 9/2009 |
| JP | 2009226852 A | 10/2009 |
| JP | 2009233977 A | 10/2009 |
| JP | 2009234219 A | 10/2009 |
| JP | 2010054855 A | 3/2010 |
| JP | 2010105365 A | 5/2010 |
| JP | 2010173201 A | 8/2010 |
| JP | 2010228192 A | 10/2010 |
| JP | 2010241073 A | 10/2010 |
| JP | 2010258193 A | 11/2010 |

(56) References Cited

FOREIGN PATENT DOCUMENTS

| | | | |
|---|---|---|---|
| JP | 2010260204 A | 11/2010 | |
| JP | 2011025431 A | 2/2011 | |
| JP | 2011173325 A | 9/2011 | |
| JP | 2011173326 A | 9/2011 | |
| JP | 2011186346 A | 9/2011 | |
| JP | 2011224032 A | 11/2011 | |
| JP | 2012042943 A | 3/2012 | |
| JP | 2012086499 A | 5/2012 | |
| JP | 2012111194 A | 6/2012 | |
| JP | 2012126123 A | 7/2012 | |
| JP | 2012139905 A | 7/2012 | |
| JP | 2013001081 A | 1/2013 | |
| JP | 2013060299 A | 4/2013 | |
| JP | 2013103474 A | 5/2013 | |
| JP | 2013121671 A | 6/2013 | |
| JP | 2013129158 A | 7/2013 | |
| WO | 8600327 A1 | 1/1986 | |
| WO | 9307000 A1 | 4/1993 | |
| WO | WO-9631809 A1 | 10/1996 | |
| WO | 9736210 A1 | 10/1997 | |
| WO | 9821251 A1 | 5/1998 | |
| WO | 9855901 A1 | 12/1998 | |
| WO | 0170512 A1 | 9/2001 | |
| WO | 2004113082 A1 | 12/2004 | |
| WO | 2004113450 A1 | 12/2004 | |
| WO | 2006069205 A1 | 6/2006 | |
| WO | 2006073696 A1 | 7/2006 | |
| WO | 2006091957 A2 | 8/2006 | |
| WO | 2007009871 A2 | 1/2007 | |
| WO | 2009025809 A1 | 2/2009 | |
| WO | 2013087249 A1 | 6/2013 | |
| WO | 2013132339 A1 | 9/2013 | |
| WO | 2013132356 A1 | 9/2013 | |
| WO | 2013132418 | 9/2013 | |
| WO | 2013132419 A1 | 9/2013 | |
| WO | 2013132420 A1 | 9/2013 | |
| WO | 2013132424 A1 | 9/2013 | |
| WO | 2013132432 A1 | 9/2013 | |
| WO | 2013136220 | 9/2013 | |
| WO | 2015036864 A1 | 3/2015 | |
| WO | 2015036960 A1 | 3/2015 | |
| WO | WO-2016166690 A1 | 10/2016 | |

OTHER PUBLICATIONS

CN101177057 Machine Translation (by EPO and Google)—published May 14, 2008—Hangzhou Yuanyang Industry Co.
CN102925002 Machine Translation (by EPO and Google)—published Feb. 13, 2013; Jiangnan University, Fu et al.
DE102010060999 Machine Translation (by EPO and Google)—published Jun. 6, 2012; Wolf, Roland, Dr.-Ing.
JP2000169772 Machine Translation (by EPO and Google)—published Jun. 20, 2000; Tokyo Ink MFG Co Ltd.
JP2001/206522 Machine Translation (by EPO, PlatPat and Google)—published Jul. 31, 2001; Nitto Denko Corp, Kato et al.
JP2002-169383 Machine Translation (by EPO, PlatPat and Google)—published Jun. 14, 2002 Richo KK.
JP2002234243 Machine Translation (by EPO and Google)—published Aug. 20, 2002; Hitachi Koki Co Ltd.
JP2002-278365 Machine Translation (by PlatPat English machine translation)—published Sep. 27, 2002 Katsuaki, Ricoh KK.
JP2002-326733 Machine Translation (by EPO, PlatPat and Google)—published Nov. 12, 2002; Kyocera Mita Corp.
JP2002371208 Machine Translation (by EPO and Google)—published Dec. 26, 2002; Canon Inc.
JP2003-114558 Machine Translation (by EPO, PlatPat and Google)—published Apr. 18, 2003 Mitsubishi Chem Corp, Yuka Denshi Co Ltd, et al.
JP2003-211770 Machine Translation (by EPO and Google)—published Jul. 29, 2003 Hitachi Printing Solutions.
JP2003-246484 Machine Translation (English machine translation)—published Sep. 2, 2003 Kyocera Corp.
JP2004-114377 Machine Translation (by EPO and Google)—published Apr. 15, 2004; Konica Minolta Holdings Inc, et al.
JP2004-114675 Machine Translation (by EPO and Google)—published Apr. 15, 2004; Canon Inc.
JP2004-231711 Machine Translation (by EPO and Google)—published Aug. 19, 2004; Seiko Epson Corp.
JP2005-014255 Machine Translation (by EPO and Google)—published Jan. 20, 2005; Canon Inc.
JP2005-014256 Machine Translation (by EPO and Google)—published Jan. 20, 2005; Canon Inc.
JP2006-102975 Machine Translation (by EPO and Google)—published Apr. 20, 2006; Fuji Photo Film Co Ltd.
JP2006-137127 Machine Translation (by EPO and Google)—published Jun. 1, 2006; Konica Minolta Med & Graphic.
JP2006-347081 Machine Translation (by EPO and Google)—published Dec. 28, 2006; Fuji Xerox Co Ltd.
JP2007-069584 Machine Translation (by EPO and Google)—published Mar. 22, 2007 Fujifilm.
JP2007-216673 Machine Translation (by EPO and Google)—published Aug. 30, 2007 Brother Ind.
JP2008-006816 Machine Translation (by EPO and Google)—published Jan. 17, 2008; Fujifilm Corp.
JP2008-018716 Machine Translation (by EPO and Google)—published Jan. 31, 2008; Canon Inc.
JP2008-142962 Machine Translation (by EPO and Google)—published Jun. 26, 2008; Fuji Xerox Co Ltd.
JP2008-201564 Machine Translation (English machine translation)—published Sep. 4, 2008 Fuji Xerox Co Ltd.
JP2008-255135 Machine Translation (by EPO and Google)—published Oct. 23, 2008; Fujifilm Corp.
JP2009-045794 Machine Translation (by EPO and Google)—published Mar. 5, 2009; Fujifilm Corp.
JP2009045885(A) Machine Translation (by EPO and Google)—published Mar. 5, 2009; Fuji Xerox Co Ltd.
JP2009-083317 Abstract; Machine Translation (by EPO and Google)—published Apr. 23, 2009; Fuji Film Corp.
JP2009-083325 Abstract; Machine Translation (by EPO and Google)—published Apr. 23, 2009 Fujifilm.
JP2009096175 Machine Translation (EPO, PlatPat and Google) published on May. 7, 2009 Fujifilm Corp.
JP2009-154330 Machine Translation (by EPO and Google)—published Jul. 16, 2009; Seiko Epson Corp.
JP2009-190375 Machine Translation (by EPO and Google)—published Aug. 27, 2009; Fuji Xerox Co Ltd.
JP2009-202355 Machine Translation (by EPO and Google)—published Sep. 10, 2009; Fuji Xerox Co Ltd.
JP2009-214318 Machine Translation (by EPO and Google)—published Sep. 24, 2009 Fuji Xerox Co Ltd.
JP2009214439 Machine Translation (by PlatPat English machine translation)—published Sep. 24, 2009 Fujifilm Corp.
JP2009-226852 Machine Translation (by EPO and Google)—published Oct. 8, 2009; Hirato Katsuyuki, Fujifilm Corp.
JP2009-233977 Machine Translation (by EPO and Google)—published Oct. 15, 2009; Fuji Xerox Co Ltd.
JP2009-234219 Machine Translation (by EPO and Google)—published Oct. 15, 2009; Fujifilm Corp.
JP2010-054855 Machine Translation (by PlatPat English machine translation)—published Mar. 11, 2010 Itatsu, Fuji Xerox Co.
JP2010-105365 Machine Translation (by EPO and Google)—published May 13, 2010; Fuji Xerox Co Ltd.
JP2010-173201 Abstract; Machine Translation (by EPO and Google)—published Aug. 12, 2010; Richo Co Ltd.
JP2010228192 Machine Translation (by PlatPat English machine translation)—published Oct. 14, 2010 Fuji Xerox.
JP2010-241073 Machine Translation (by EPO and Google)—published Oct. 28, 2010; Canon Inc.
JP2010-258193 Machine Translation (by EPO and Google)—published Nov. 11, 2010; Seiko Epson Corp.
JP2010260204(A) Machine Translation (by EPO and Google)—published Nov. 18, 2010; Canon KK.
JP2011-025431 Machine Translation (by EPO and Google)—published Feb. 10, 2011; Fuji Xerox Co Ltd.

(56) References Cited

OTHER PUBLICATIONS

JP2011-173325 Abstract; Machine Translation (by EPO and Google)—published Sep. 8, 2011; Canon Inc.
JP2011-173326 Machine Translation (by EPO and Google)—published Sep. 8, 2011; Canon Inc.
JP2011186346 Machine Translation (by PlatPat English machine translation)—published Sep. 22, 2011 Seiko Epson Corp, Nishimura et al.
JP2011224032 Machine Translation (by EPO & Google)—published Jul. 5, 2012 Canon KK.
JP2012-086499 Machine Translation (by EPO and Google)—published May 10, 2012; Canon Inc.
JP2012-111194 Machine Translation (by EPO and Google)—published Jun. 14, 2012; Konica Minolta.
JP2013-001081 Machine Translation (by EPO and Google)—published Jan. 7, 2013; Kao Corp.
JP2013-060299 Machine Translation (by EPO and Google)—published Apr. 4, 2013; Ricoh Co Ltd.
JP2013-103474 Machine Translation (by EPO and Google)—published May. 30, 2013; Ricoh Co Ltd.
JP2013-121671 Machine Translation (by EPO and Google)—published Jun. 20, 2013; Fuji Xerox Co Ltd.
JP2013-129158 Machine Translation (by EPO and Google)—published Jul. 4, 2013; Fuji Xerox Co Ltd.
JPH05147208 Machine Translation (by EPO and Google)—published Jun. 15, 1993—Mita Industrial Co Ltd.
JPS56-7968 Machine Translation (by PlatPat English machine translation); published on Jun. 28, 1979, Shigeyoshi et al.
Machine Translation (by EPO and Google) of JPH70112841 published on May 2, 1995 Canon KK.
Thomas E. F., "CRC Handbook of Food Additives, Second Edition, Volume 1" CRC Press LLC, 1972, p. 434.
WO2013/087249 Machine Translation (by EPO and Google)—published Jun. 20, 2013; Koenig & Bauer AG.
CN101873982A Machine Translation (by EPO and Google)—published Oct. 27, 2010; Habasit AG, Delair et al.
CN102555450A Machine Translation (by EPO and Google)—published Jul. 11, 2012; Fuji Xerox Co., Ltd, Motoharu et al.
CN103991293A Machine Translation (by EPO and Google)—published Aug. 20, 2014; Miyakoshi Printing Machinery Co., Ltd, Junichi et al.
CN1493514A Machine Translation (by EPO and Google)—published May. 5, 2004; GD SPA, Boderi et al.
IP.com Search, 2018, 2 pages.
JP2007253347A Machine Translation (by EPO and Google)—published Oct. 4, 2007; Ricoh KK, Matsuo et al.

\* cited by examiner

APPARATUS FOR THREADING AN INTERMEDIATE TRANSFER MEMBER OF A PRINTING SYSTEM

FIELD

The present disclosure relates to a printing system in which liquid ink droplets are deposited at an image forming station onto a movable intermediate transfer member and transferred at an impression station from the intermediate transfer member onto a printing substrate. Specifically this disclosure pertains to an apparatus for threading the intermediate transfer member through the various stations of the printing system.

BACKGROUND

The present Applicant has previously disclosed a printing system and process wherein images made up of inks having an aqueous carrier are jetted onto a recirculating intermediate transfer member that transports them to an impression station where they are transferred to the desired printing substrate (e.g., paper, cardboard, plastic films etc.). As against inkjet printers, that deposit ink directly onto the printing substrate, such systems allow the distance between the surface of the intermediate transfer member and the inkjet print head to be maintained constant and reduces wetting of the substrate, as the inks may be dried while being transported by the intermediate transfer member before they are transferred to the substrate. Consequently, the final image quality on the substrate is less affected by the physical properties of the substrate and benefits from various other advantages as a result of the image remaining above the substrate surface. More details of such a system are disclosed in WO2013/132418, filed on Mar. 5, 2013 and incorporated herein by reference.

The present disclosure is concerned with an apparatus for assisting with the initial installation of the intermediate transfer member in such a printing system and with its replacement when the need arises without having to separate the various components of the printing system.

At the image forming station, the intermediate transfer member in such a printing system needs to pass through a narrow gap between the print heads and its own support and drive system, and it needs to be maintained both taut and at a fixed distance from the print heads. To achieve this, WO 2013/132418 describes in FIG. 11 how formations may be provided along the lateral edges of the intermediate transfer member that are received in guide channels having, for instance, a C-shaped cross section that is shown in FIG. 12 of the latter publication. The formations may be the teeth of two zip fastener halves, or any other type of "beads" that can properly move in the guide channels, that are attached to the respective lateral edges of the intermediate transfer member and their engagement in the guide channels serves both to constrain the path followed by the intermediate transfer member and to maintain it under lateral tension.

The intermediate transfer member is seamed once installed and starts life as a long strip, also termed a blanket in practice, but the latter term will not be used herein as it also common to refer to the installed intermediate transfer member as a blanket. The strip needs to be threaded through the various stations of the printing systems and, after it has been threaded around its entire path, its ends strip can be cut to the correct length, if necessary, and joined to one another to form a continuous loop. The ends of the strip can be attached to one another by soldering, gluing, taping (e.g., using Kapton® tape, RTV liquid adhesives or PTFE thermoplastic adhesives with a connective strip overlapping both edges of the strip), or any other method commonly known. Any method of joining the ends of the blanket strip to form an intermediate transfer member may cause a discontinuity, referred to herein as a seam.

The seam can be of different types. In particular, the edges may overlap one another or a patch may be applied to overlie the two ends. In either case, the seam may be subsequently processed, such as my grinding, to reduce its thickness.

To feed the strip into the printing system, it was proposed by the present Applicant in WO2013/136220 to provide entry points in the guide channels and to mount an external threading mechanism, shown in FIGS. 9 and 10 of the latter publication, for gripping the formations on the lateral edges of the strip and advancing its two lateral edges at the same rate into their respective guides. However, even with the aid of such a threading mechanism, it was found that the intermediate transfer member was difficult to install on account of buckling on meeting resistance or an obstruction.

It was also proposed in WO2013/136220 (see FIG. 13) to provide a loop of cable permanently housed in one or both of the tracks. The aim was to anchor the leading end of the replacement belt to the cable then to use the cable to feed the strip through the various tracks. During normal use, the cable(s) would remain stationary in the track(s) and only be rotated during installation of a new intermediate transfer member.

The use of cable loops was not found satisfactory and the present disclosure therefore aims to simplify the task of installing and replacing an intermediate transfer member in an indirect printing system.

SUMMARY

According to the present disclosure, there is provided a printing system having an intermediate transfer member in the form of an endless belt for transporting an ink image from an image forming station, at which an ink image is deposited on the intermediate transfer member, to an impression station, where the ink image is transferred onto a printing substrate, the belt having along its edges formations of a greater thickness than the belt, which formations are received in channels to guide the belt and maintain the belt under lateral tension, the printing system further comprises two endless drive members, each located within a respective one of the channels, the two drive members being connected for movement in synchronism with one another and each having a respective laterally projecting gripper shaped for form locking engagement with the formations on a leading end of a strip from which the intermediate transfer member is to be formed, rotation of the drive members during installation of a new intermediate transfer member being operative to thread the strip through the printing system by pulling the strip from its leading end.

The threading mechanism in the present proposal differs from that disclosed in FIGS. 9 and 10 of WO2013/136220 in that the strip for forming the intermediate transfer member is pulled through the printing system by its leading end instead of being pushed from behind along its desired path. The strip is therefore maintained under longitudinal tension and thereby avoids buckling of the strip if the leading end of the strip should encounter resistance or an obstruction.

The present disclosure differs from the embodiment shown in FIG. 13 of WO2013/136220 in that it uses grippers that engage the formations on the strip. This can ensure that the imaginary line extending the two grippers lies exactly perpendicular to the longitudinal axis of the strip, to avoid any tendency for the strip to be pulled towards one side or the other. Furthermore, because the grippers are capable of engaging with the formations provided on the lateral edges of the leading end of the strip, the strips may to be cut from a continuous web without any special adaptation being required for connection of the strip to the drive members used to thread it through the printing system.

In some embodiments, the drive members have the form of chains or toothed belts in place of cables. As these are driven by toothed drive wheels or cogs, slipping can be avoided and this ensures that the strip is always pulled along at exactly the same rate on its two sides.

Despite engagement of the lateral edges of the leading end of the strip in the guide channels, the leading edge of the strip may still sag at the centreline of the strip and prove hard to introduce into some of the narrow gaps through which it has to be threaded.

To assist in this task, in some embodiments of the invention, the leading edge of the strip is cut at an angle and is not perpendicular to the lateral edges of the strip.

A severely inclined leading end would need to be trimmed after it has been threaded through the printing system to avoid increasing the length of the unusable seam region of the intermediate transfer member. To minimise the wastage caused by such trimming while retaining the advantage of smoother threading, it is convenient to form the leading edge with a V-shaped cut out with two sections inclined relative to the lateral edges of the strip instead of one extending across the entire width of the strip.

After threading of the intermediate transfer member, its ends need to be trimmed to the correct length and joined to one another to form a seam. The seam preferably extends at an angle that is slightly offset from the perpendicular to the lateral edge of the strip. This angle is so that the entire width of seam, which may not have the same thickness as the remainder intermediate transfer member, should not pass at the same time over the drive rollers of the intermediate transfer member and create an abrupt change in tension in the intermediate transfer member. The angle is chosen as a compromise between avoiding such changes in tension and increasing the length of the unusable seam region.

To assist in forming the seam between the ends of the strip after it has been threaded through the printing system, a support plate may be provided in the printing system for supporting ends of the strip that are to be cut and joined to one another, the support plate not contacting the intermediate transfer member subsequent to installation of the intermediate transfer member.

Alternatively, the leading end of the strip can be transiently attached to a removable leader. The leader can have lateral formations compatible with the grippers of the drive members and can be releasably attached to the leading end of the strip. While the removable leader may be shaped as above described for the leading end, it may alternatively or additionally be made of a material less prone to sagging than the intermediate transfer member being installed. The leader can be made of a material rigid enough to allow threading of the strip through narrow gaps without interfering with adjacent parts of the printing system, but flexible enough to bend within the lateral guide channels, were curved guide channels be present along the path followed by the intermediate transfer member. In the following, and unless otherwise clear from context, the term leading end interchangeably refer to the integral leading end of the strip being installed and to the removable leader transiently attached to this end.

When a removable leader is attached to the strip, the strip may have a predetermined length and its ends may be shaped to enable the belt to have substantially the same thickness at the seam as along the remainder of its length. This may be achieved by forming a respective rebate in the rear surface of each end to receive a tape having the same width as the combined widths of the two rebates and a thickness matching the depth of the rebates. In this way, the tape used to join the two ends of the strip is recessed into the strip instead of lying above it and therefore does not cause a thickening of the intermediated transfer member at its seam.

In accordance with a second aspect of the disclosure, there is provided a method of installing an intermediate transfer member in a printing system having an intermediate transfer member in the form of an endless belt for transporting an ink image from an image forming station, at which an ink image is deposited on the intermediate transfer member, to an impression station, where the ink image is transferred onto a printing substrate, the belt having along its edges formations of a greater thickness than the belt, which formations are received in channels to guide the belt and maintain the belt under lateral tension, which method comprises providing an elongate strip of a length exceeding the circumference of the intermediate transfer member, connecting a leading end of the strip to two grippers projecting laterally from two drive members that each disposed within a respective one of the two channels by engaging formations on a leading end of the strip with the two grippers, rotating the drive members in synchronism with one another to thread the leading end of the strip through the stations of the printing system, and joining the ends of the strip to one another to form an endless intermediate transfer member after the strip has been threaded through the printing system.

In an embodiment in which the strip has a separable leader and the ends of the strip are rebated, and joined to one another by adhering a tape within the rebates in the ends of the strip to form a seam while maintaining the uniformity of the thickness of the intermediate transfer member. By "rebated", it is meant that the thickness of the ends of the strip is reduced, such as by grinding, so as to define a recess for receiving the tape when the two ends of the strip are abutted against one another.

In accordance with a third aspect of the disclosure, there is provided a printing system having an intermediate transfer member in the form of an endless belt for transporting an ink image from an image forming station, at which an ink image is deposited on the intermediate transfer member, to an impression station, where the ink image is transferred onto a printing substrate, the belt having along its edges formations of a greater thickness than the belt, which formations are received in channels to guide the belt and maintain the belt under lateral tension, the printing system further comprising two endless drive members, each located within a respective one of the channels, the two drive members being connected for movement in synchronism with one another and rotation of the drive members during installation of a new intermediate transfer member being operative to thread a strip from which the intermediate transfer member is to be formed through the printing system by pulling the strip from its leading end, wherein opposite ends of the strip are formed with rebates for receiving a joining tape to form a seam, and are joined at a seam while maintaining the thickness of the intermediate transfer member uniform throughout its length In accordance with a fourth aspect of the disclosure, there is provided a method of installing an intermediate transfer member in a printing system having an intermediate transfer member in the form of an endless belt for transporting an ink image from an image forming station, at which an ink image is deposited on the intermediate transfer member, to an impression station, where the ink image is transferred onto a printing substrate, which method comprises providing an elongate strip of predetermined length corresponding to the circumferential length of the intermediate transfer member, threading the strip through the printing system, providing rebates along the end edges, and joining the end edges to one another by means of tape that is recessed within the rebates and secured to the ends of the strip, so to form a seam having substantially the same thickness as the strip.

The end edges of the strip may be rebated prior to threading of the strip through the printing system and a leader may be releasably secured to one of the two rebated ends of the strip to assist in threading the strip through the printing system.

BRIEF DESCRIPTION OF THE DRAWINGS

The invention will now be described further, by way of example, with reference to the accompanying drawings, in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate identical components but may not be referenced in the description of all figures.

DETAILED DESCRIPTION OF THE DRAWINGS

Figure 1:
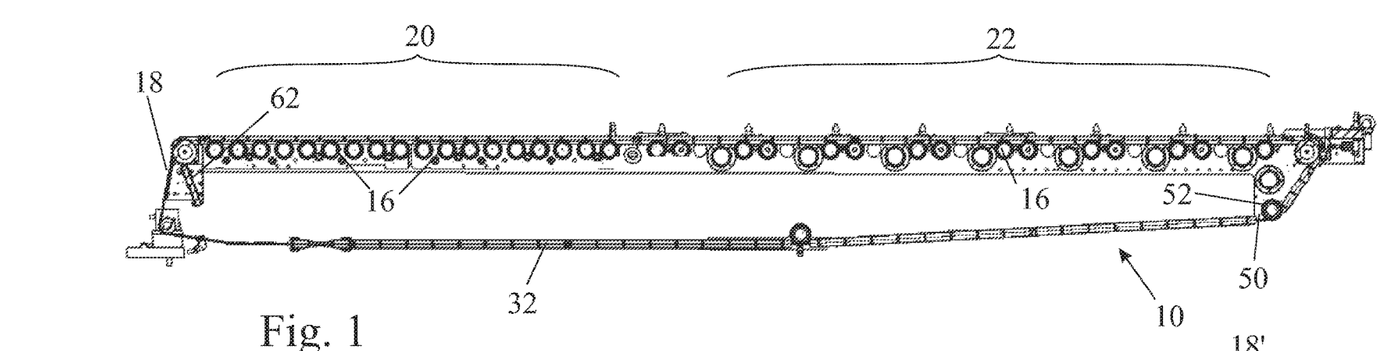
FIG. 1 is a section through a support system of an intermediate transfer member.
Figure 2:
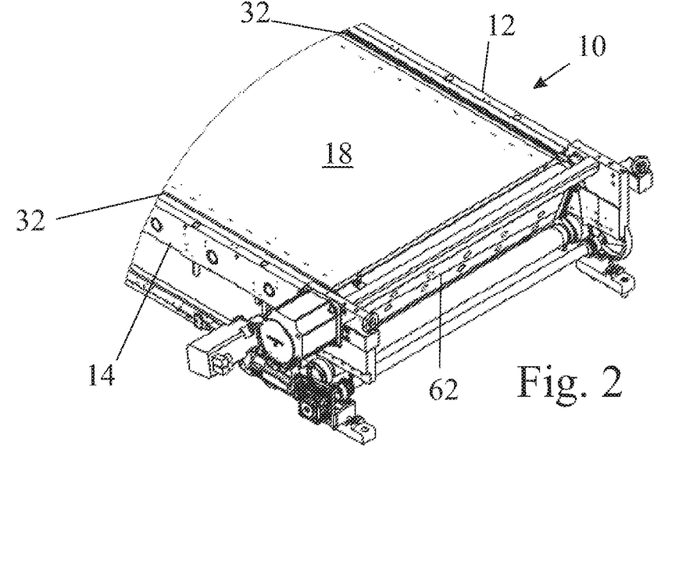
FIG. 2 is a perspective view of one end of the support system shown in FIG. 1.

An intermediate transfer member support system 10 shown in FIGS. 1 and 2 comprises two lateral frames 12 and 14, arranged one on each side of the intermediate transfer member 18, and various support, drive and tensioning rollers 16 extending transversely between the two frames 12 and 14 to constrain the intermediate transfer member to follow a closed loop and pass through the various stations of the printing system. The remainder of the printing system and more details of the intermediate transfer member support system are well documented in the prior art and need not therefore be repeated in the present context. Essentially, in the region designated 20 the intermediate transfer member passes beneath an image forming station where ink is deposited on the intermediate transfer member to form an image. The intermediate transfer member rotates clockwise as viewed to carry the ink image to the region designated 22, where the wet image is heated to evaporate the ink carrier and leave behind a tacky resin film. Along its lower run, the intermediate transfer member passes through one or more impression stations where it is pressed against a substrate, so that the tacky film separates from the intermediate transfer member and is transferred to the surface substrate.

The intermediate transfer member support system 10 is designed to ensure that the intermediate transfer member remains substantially flat and taut as it passes the regions 20 and 22 and as it approaches the nip of the impression stations. In order to achieve this objective, the edges of the intermediate transfer member 18 have formations 30 in the form of zipper teeth, shown in FIGS. 3 and 4, that have a greater thickness than the transfer member 18 and are received in C-shaped guide channels 32 secured to the lateral frames 12 and 14. The guide channels 32 are shown in FIG. 1 and their position in the support system is shown in FIG. 2. Further details of the formations 30 and the guide channels 32 are disclosed WO2013/132418 and are shown in FIGS. 11 and 12 of that publication. It is to be understood that the guide channels may have any alternative cross section shape, as long as the lateral formations and the guide channels are compatible and suitable to guide the intermediate transfer member and maintain it under lateral tension while the printing system is operating.

The intermediate transfer member 18 is installed by threading a strip 18' through the printing system and connecting its ends to one another by means of a seam, in order to form a seamed endless loop. The present disclosure is concerned with simplifying this task, which needs to be carried out, not only during manufacture, but from time to time during use as the intermediate transfer member is subjected to wear.

The installation of a new or replacement intermediate transfer member 18 is made difficult by the fact that its lateral formations 30 need to be introduced into the guide channels 32 and, as can be seen in FIG. 1, these need not be continuous. Because they maintain the intermediate transfer member under lateral tension, engagement of the formations 30 in the guide channels 32 creates drag and makes threading of the strip 18' from which the intermediate transfer member more difficult.

To mitigate this problem, in the disclosed embodiment, two endless drive members, in the form of chains 50 passing over sprockets 52 are provided alongside the edges of the intermediate transfer member 18, preferably within the enclosed cross section of the C-shaped channels 32. Reference to chains passing over sprockets is intended herein to include the equivalent of toothed belts passing over toothed pulleys. Each of the chains 50 has a respective laterally projecting gripper 54, most clearly shown in FIG. 4, that engages the formations 30 of the intermediate transfer member strip 18' at its leading end in a form locking manner. After the gripper 54 has engaged the formations on the leading edge of the strip 18', the two endless chains 50 are driven to pull the strip 18' by its leading end, in the direction shown by the arrows in FIG. 3, through the various stations of the printing system. To ensure that the two chains 50 move in synchronism, two of their drive sprockets 52 are mounted on a common axle that is connected either to a crank for manual operation, or to a suitable motor if threading is automated.

The intermediate transfer member 18 may in some locations have to be threaded through a gap that is as narrow as 2 mm, while its width may typically be about 1,000 mm. Sagging of the leading edge of the strip 18' being threaded through the printing system can therefore cause a problem. This is mitigated by forming a V-shaped cut-out 60 in the leading edge of the strip in the manner shown in FIG. 5.

Figures 3, 4, 5:
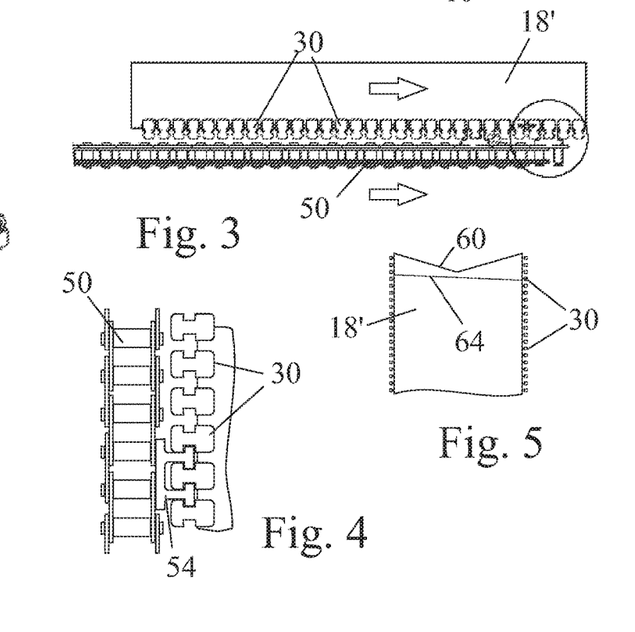
FIG. 3 is a section through one of the guide channels of the intermediate transfer member with one of the drive members running alongside the formations on the lateral edges of the intermediate transfer member.
FIG. 4 is a detail of FIG. 3 drawn to an enlarged scale.
FIG. 5 shows the leading end of a strip that is threaded through a printing system to form an intermediate transfer member.

Once the strip has been pulled around the entire printing system, and its leading end comes round to the end of the support system shown in FIG. 2, the opposite ends of the strip are laid over a support plate 62 and joined to one another to form a seam, which may, as shown in FIG. 5, extend along an inclined line 64. After the seam has been formed, a tension roller is extended to maintain the intermediate transfer member under the desired longitudinal tension and space it from the grippers 54 that remain stationary during operation of the printing system.

To form the seam, the two ends of the strip 18' may be laid one over the other on the support plate 62 and cut along the inclined line 64. While retained on the support plate 62 with the cut edges in abutting relation, an adhesive tape may be laid over the two ends to create the desired join. Such a method of forming the two ends results in a seam having an increased thickness and in order that it should not create a sudden change in tension as it passes over drive rollers or through an impression station, the cut line 64 may be inclined in the manner illustrated in FIG. 5.

Figure 6:
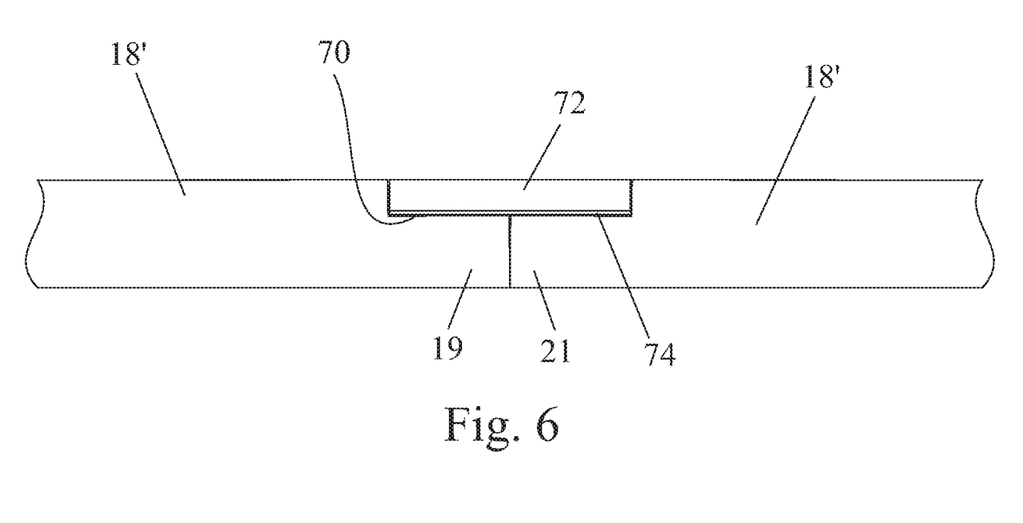
FIG. 6 shows the manner in which the ends of a strip may be joined at a seam while maintaining the thickness of the intermediate transfer member uniform throughout its length.

It is alternatively possible to form a seam without increasing the thickness of the intermediate transfer member and this is shown in FIG. 6. In this case, the strip 18' is made to a predetermined length and is attached to a separable leader at its leading end. The leading 19 and trailing 21 ends of the strip 18' proper, would be ground down to form rebates 70 for receiving a tape 75 that is as wide as the two rebates 72. The tape 72 is secured to the two ends of the strip 18' by a layer 74 of adhesive.

In an embodiment where the thickness of the strip 18' is about 550 μm, the rebates in the ends of the strip may have a depth of 200 μm. The rebates can then accommodate a tape having a thickness of about 150 μm leaving 50 μm for the thickness of the adhesive layer 74.

The separable leader should be made of a flexible material so that it may follow the path of the intermediate transfer member but it may be made of a stiffer material than the strip 18' so as to have less tendency to sag. The leader may, as shown in FIG. 5, have a V-shaped leading edge and it should have formations that are continuous with the formations on the sides of the strip 18'.

It is understood that in addition to the image forming station and the impression station above-mentioned, a printing system may further comprise a treatment station and/or a cleaning station to respectively treat and/or clean the intermediate transfer member, a drying station to evaporate liquid carrier out of the ink image, a cooling or a heating station to modify the temperature of the intermediate transfer member along its path, a finishing station for further processing the printed substrate, and so on. All such stations need not be considered in detail in the present context.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the present disclosure has been described with respect to various specific embodiments presented thereof for the sake of illustration only, such specifically disclosed embodiments should not be considered limiting. Many other alternatives, modifications and variations of such embodiments will occur to those skilled in the art based upon Applicant's disclosure herein. Accordingly, it is intended to embrace all such alternatives, modifications and variations and to be bound only by the spirit and scope of the appended claims and any change which come within their meaning and range of equivalency.

In the description and claims of the present disclosure, each of the verbs "comprise", "include" and "have", and conjugates thereof, are used to indicate that the object or objects of the verb are not necessarily a complete listing of features, members, steps, components, elements or parts of the subject or subjects of the verb.

As used herein, the singular form "a", "an" and "the" include plural references and mean "at least one" or "one or more" unless the context clearly dictates otherwise.

Unless otherwise stated, the use of the expression "and/or" between the last two members of a list of options for selection indicates that a selection of one or more of the listed options is appropriate and may be made.

Unless otherwise stated, adjectives such as "substantially" and "about" that modify a condition or relationship characteristic of a feature or features of an embodiment of the present technology, are to be understood to mean that the condition or characteristic is defined to within tolerances that are acceptable for operation of the embodiment for an application for which it is intended.

To the extent necessary to understand or complete the present disclosure, all publications, patents, and patent applications mentioned herein, including in particular the applications of the Applicant, are expressly incorporated by reference in their entirety by reference as is fully set forth herein.

The invention claimed is:

1. A printing system having an intermediate transfer member in the form of an endless belt for transporting an ink image from an image forming station, at which an ink image is deposited on the intermediate transfer member, to an impression station, where the ink image is transferred onto a printing substrate, the belt having along its edges formations of a greater thickness than the belt, which formations are received in channels to guide the belt and maintain the belt under lateral tension, the printing system further comprises two endless drive members, each located within a respective one of the channels, the two drive members being connected for movement in synchronism with one another and each having a respective laterally projecting gripper shaped for form locking engagement with the formations on a leading end of a strip from which the intermediate transfer member is to be formed, rotation of the drive members during installation of a new intermediate transfer member being operative to thread the strip through the printing system by pulling the strip from its leading end.

2. A printing system as claimed in claim 1, wherein a support plate is provided in the printing system for supporting ends of the strip that are to be joined to one another at a seam in order to convert the strip into an endless belt, the support plate not contacting the intermediate transfer member subsequent to installation.

3. A printing system as claimed in claim 1, wherein the strip has a V-shaped leading edge.

4. A printing system as claimed in claim 3, wherein the leading edge is formed as part of a leader that is separably connected to one end of the strip.

5. A printing system as claimed in claim 4, wherein the end of the strip connected to the leader and the opposite ends of the strip are formed with rebates for receiving a joining tape to form a seam.

6. A printing system as claimed in claim 1, wherein the opposite ends of the strip are joined at a seam while maintaining the thickness of the intermediate transfer member uniform throughout its length.

7. A printing system as claimed in claim 1, wherein the drive members are in the form of chains or toothed belts.

8. A method of installing an intermediate transfer member in a printing system having an intermediate transfer member in the form of an endless belt for transporting an ink image from an image forming station, at which an ink image is deposited on the intermediate transfer member, to an impression station, where the ink image is transferred onto a printing substrate, the belt having along its edges formations of a greater thickness than the belt, which formations are received in channels to guide the belt and maintain the belt under lateral tension, which method comprises:
   (a) providing an elongate strip of a length exceeding the circumference of the intermediate transfer member,
   (b) connecting a leading end of the strip to two grippers projecting laterally from two drive members that are each disposed within a respective one of the two channels by engaging formations on a leading end of the strip with the two grippers,
   (c) rotating the drive members in synchronism with one another to thread the leading end of the strip through the stations of the printing system, and
   (d) joining the ends of the strip to one another to form an endless intermediate transfer member after the strip has been threaded through the printing system.

9. A method as claimed in claim 8, wherein the strip has a separable leader and the ends of the strip are rebated and wherein, after separating the leader from the remainder of the strip, the ends of the strip are joined to one another by adhering a tape within the rebates in the ends of the strip to form a seam while maintaining the uniformity of the thickness of the intermediate transfer member.

10. A method as claimed in claim 8, wherein the drive members are in the form of chains or toothed belts.

11. A method of installing an intermediate transfer member in a printing system having an intermediate transfer member in the form of an endless belt for transporting an ink image from an image forming station, at which an ink image is deposited on the intermediate transfer member, to an impression station, where the ink image is transferred onto a printing substrate, which method comprises:
   (a) providing an elongate strip of predetermined length corresponding to the circumferential length of the intermediate transfer member,
   (b) threading the strip through the printing system,
   (c) providing rebates along the end edges, and
   (d) joining the end edges to one another by means of a tape that is recessed within the rebates and secured to the ends of the strip, so to form a seam having substantially the same thickness as the strip.

12. A method as claimed in claim 11, wherein the end edges of the strip are rebated prior to threading of the strip through the printing system.

13. A method as claimed in claim 11, wherein a leader is releasably secured to one of the two rebated ends of the strip to assist in threading the strip through the printing system.

\* \* \* \* \*